(No Model.)
A. D. NORDSTRÖM.
THERMOMETER.
No. 499,750. Patented June 20, 1893.
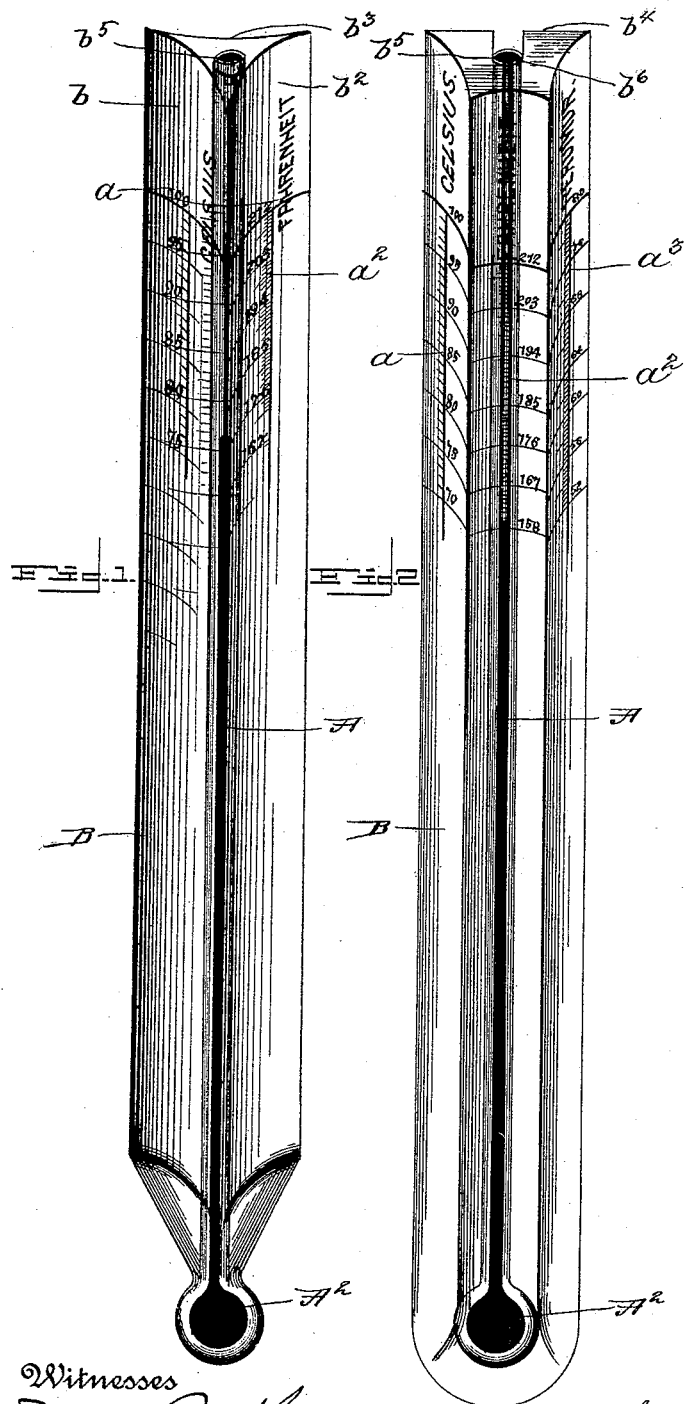
Witnesses
W. N. Pumphrey
J. K. Buckingham
Inventor
Andrew D. Nordström
by Evart & Appleman
Attorneys

UNITED STATES PATENT OFFICE.

ANDREW D. NORDSTRÖM, OF SNAKE, MINNESOTA.

THERMOMETER.

SPECIFICATION forming part of Letters Patent No. 499,750, dated June 20, 1893.

Application filed September 3, 1892. Serial No. 444,974. (No model.)

*To all whom it may concern:*

Be it known that I, ANDREW D. NORDSTRÖM, a citizen of the United States of America, residing at Snake, in the county of Marshall and State of Minnesota, have invented certain new and useful Improvements in Thermometers, of which the following is a specification, reference being had therein to the accompanying drawings.

This invention relates to certain improvements in "mountings" for thermometers.

The object of the invention is to provide a mercurial column in combination with a transparent scale board, the latter being so peculiarly constructed, whereby an accurate reading from either of the three well known systems, may be readily and conveniently taken.

Furthermore, the object of the invention is to provide in an improved article of manufacture a thermometer bearing three scales, marked after the systems of "Celsius," "Fahrenheit" and "Reaumur," said scales being arranged adjacent to and equidistant from the mercurial column to facilitate a ready and accurate reading of the same. Finally the invention contemplates the provision of a thermometer, that shall be strong, durable, and thoroughly efficient in use and comparatively inexpensive of manufacture.

With these objects in view, the invention consists in a thermometer comprising the usual form of mercurial column which is adapted to be inclosed and protected by a transparent scale board, preferably of glass. Furthermore, said scale board may be formed hollow, for the reception of said column supporting tube or for the column proper as desired and of as many sides as there are scales; or where the board is adapted for hanging against the wall, of a corresponding number of sides to that of the scale, plus one, and finally the invention consists in various novel details of construction hereinafter to be more particularly described and specifically pointed out in the claim.

In describing my invention in detail, reference is had to the accompanying drawings forming a part of this specification, wherein like letters of reference indicate corresponding parts in both views, in which—

Figure 1, is a view in perspective of one form of device embodying my improvements. Fig. 2, is a similar view, showing a modified form of scale board.

In the drawings, A, indicates the mercurial column of ordinary construction; $A^2$, the bulb and B, the scale board.

Referring to Fig. 1, wherein the board B, is triangular in cross section and provided with concave sides, $b$, $b^2$, $b^3$, $a$, $a^2$, $a^3$ represent graduated scales after well known systems of Celsius, Fahrenheit and Reaumur respectively, said markings being located adjacent and at the same time equidistant to the column; furthermore, the board, in this instance being constructed of some transparent material preferably glass, allows for a ready and accurate reading, as will be at once obvious.

The advantages arising from having but a thin sheet of glass between the markings for each scale and the column will be readily apparent, in view of the device in use at the present day, wherein only one scale is immediately under or at the side of the tube supporting column, and as a result, but one can be readily and accurately read.

In Fig. 2, a modified form of device is shown, wherein $b^4$, represents a blank side, adapted for resting against the wall or in such position where a freely suspended tube as in Fig. 1, would be undesirable.

In the several forms above described, it will be understood that the scale-board may be so designed as to contain the mercury in the central chamber $b^5$, or the said chamber may be constructed in such suitable proportion as to adapt it for the reception of the usual tube $b^6$ inclosing the column proper as shown in Fig. 2. Again, various changes may be made in the detail construction without materially departing from the general idea involved.

Having fully described my invention, what I claim, and desire to secure by Letters Patent, is—

In a thermometer, the combination with a mercurial column, of a transparent scale board having three concave sides and the scale markings representing the systems of Reaumur, Celsius and Fahrenheit, arranged thereon at equidistant points from said column, substantially as described.

In testimony whereof I affix my signature in presence of two witnesses.

ANDREW D. NORDSTRÖM.

Witnesses:
JOHN E. OSTROM,
DANIEL NORDSTRÖM.